US007073164B1

(12) United States Patent
Knowles

(10) Patent No.: US 7,073,164 B1
(45) Date of Patent: Jul. 4, 2006

(54) SOFTWARE DEPLOYMENT SYSTEM AND METHOD

(75) Inventor: G. Gordon Knowles, Dallas, TX (US)

(73) Assignee: i2 Technologies US, Inc., Dallas, TX (US)

( * ) Notice: Subject to any disclaimer, the term of this patent is extended or adjusted under 35 U.S.C. 154(b) by 760 days.

(21) Appl. No.: 10/164,516

(22) Filed: Jun. 6, 2002

Related U.S. Application Data

(60) Provisional application No. 60/296,601, filed on Jun. 7, 2001.

(51) Int. Cl.
G06F 9/44 (2006.01)
G06F 9/455 (2006.01)

(52) U.S. Cl. ............... 717/102; 717/104; 717/177

(58) Field of Classification Search ............ 717/104, 717/102
See application file for complete search history.

(56) References Cited

U.S. PATENT DOCUMENTS

| 6,125,442 | A  | * | 9/2000  | Maves et al. ............ 712/220 |
| 6,237,020 | B1 | * | 5/2001  | Leymann et al. ......... 709/201 |
| 6,377,934 | B1 | * | 4/2002  | Chen et al. ............... 705/10 |
| 6,662,355 | B1 | * | 12/2003 | Caswell et al. ........... 717/103 |
| 2002/0065879 | A1 | * | 5/2002 | Ambrose et al. ......... 709/203 |
| 2002/0116389 | A1 | * | 8/2002 | Chen et al. .............. 707/103 R |

FOREIGN PATENT DOCUMENTS

WO    WO 01/38976 A1 * 5/2001

OTHER PUBLICATIONS

V. Machiraju et al., "Towards Generic Application Auto-Discovery", 2000, IEEE.*
S. Jarzabek et al., "Model-based Design of Tools for Business Understanding and Re-engineering", 1995, IEEE.*
R. Hall et al., "A Cooperative Approach to Support Software Deployment Using the Software Dock", 1999, IEEE CS Press.*
H. Tarumi et al., "Evolution of Business Processes and a Process Simulation Tool", 1999, IEEE.*
D. Heimbigner et al., "A Framework for Analyzing Configuration of Deployable Software Systems", 1999, IEEE.*
T. Coupaye et al., "Foundations of Enterprise Software Deployment", Mar. 2000, IEEE.*

* cited by examiner

*Primary Examiner*—Kakali Chaki
*Assistant Examiner*—Trenton J. Roche
(74) *Attorney, Agent, or Firm*—Steven J. Laureanti; James E. Walton

(57) ABSTRACT

A method for deploying software includes selecting one or more pre-defined business models applicable to a business entity in which the software is being deployed. The business models are associated with particular business functions. The method further includes creating an entity model using the one or more selected business models. In addition, the method includes gathering information from the entity relevant to the selected business models and inputting the information into the entity model. The method further includes specifying functional requirements of the entity using a business modeling tool and configuring the entity model using the specified functional requirements. Moreover, the method includes automatically generating one or more specification files according to the configured entity model. The specification files identify the data to be input to the software after the software is deployed.

26 Claims, 22 Drawing Sheets

DECISION PHASE: *Orientation* Demand Planning

350

370

| Check Box 360 | Activity 320 | Involved | Tool | Deliverable |
|---|---|---|---|---|
| ☐ 1. (d01) | Present Pronto SCM concepts and demonstrate Pronto capabilities via CBT (Remote Delivery) | •Organization MS/PP/MP •Organization IT •Pronto •Partner | •Pronto CBT | •Knowledge of Pronto concepts and basic functionality |
| ☐ 2. (d02) | Conduct Prospect Business Profile (Remote Delivery) | •Organization Project Manager •Pronto •Partner | •Prospect Qualification Tool | •Prospect Business Profile Analysis •Contact Sheet |
| ☐ 3. (d02) | Conduct Value Assessment (Remote Delivery) | •Organization Project Manager •Pronto •Partner | •Value Calculator | •Prospect Value Proposition Assessment |
| ☐ 4. (d02) | Issue Data File Specification and gather prospect data (Remote Delivery) | •Organization Project Manager •Organization IT •Partner | •Data Integrity Analysis Gathering Tool | •Data Integrity Questioner |

BACK

*FIG. 5*

Customer Profile Analysis

Prospects Company: _____
Contact: _____
i2 Sales Representative: _____
Date: _____

Documentation

[Reset answers]

400

| LEVEL 2 – OPPORTUNITY ASSESSMENT | ANSWER |
|---|---|
| 1 | Are customers satisfied with delivery performance – reliability and responsiveness? | Yes |
| 2 | Are machine, labor and tool shortages a significant source of problems? | Yes |
| 3 | Is there significant unplanned overtime? | Yes |
| 4 | Is material shortage a significant source of problems? | Yes |
| 5 | Is material obsolescence a significant problem? | No |
| 6 | Are promise dates given to customers reliable? | Yes |
| 7 | Is it difficult to obtain the status of individual orders? | No |
| 8 | Is the response time for promise date or order status inquires long? | No |
| 9 | Are customers moving towards collaborative purchasing? | Yes |
| 10 | Do customers frequently change quantity or date of previously issued orders? | Yes |
| 11 | Does prospect have limited visibility into customer orders? | No |
| 12 | Is availability of key supplies a significant problem? | No |
| 13 | Is frequency of late delivery of key supplies a significant problem? | Yes |
| 14 | Does prospect have limited visibility into outstanding orders at supplier? | Yes |

Number of positive answers: 10 out of 14

PROCEED TO LEVEL 3

FIG. 6

Value Assessment

CLIENT INPUT

| | |
|---|---|
| What are your annual sales ($MM) | 217 |
| What are you annual cost of goods sold ($MM) | 177 |
| What is your annual average inventory ($MM) | 30 |
| What part of this inventory is for Finished Goods (%) | 60% |
| What is your average inventory carrying cost (%) | 25% |
| What is your average daily customer demand (Units) | 100 |
| What is the approximate variability in Demand (%) | 40% |
| What is your average lead-time (Days) | 40 |
| What is the variability in lead-time (%) | 40% |
| What portion of the lead-time is due to manufacturing (%) | 40% |
| What is the frequency of Planning (Days) | 20 |
| What is your current service level | 85% |
| What would you like your service level to be (%) | 95% |

Case Study
How to use this Tool

Business Modeling 2

| S.No. | Questions | Question in Business Process Level 1 | Response | Data Available | Data Source |
|---|---|---|---|---|---|
| 1 | Do you have multiple levels of BOM?, if yes, how many? | — | | | |
| 2 | Do you report WIP at the different stages of your routings? Is this WIP tied to the specific in-process orders or is it tracked as material available at the various operations for any relevant order? | — | | | |
| 3 | Do the input material parts get consumed at various stages in a routing? | Operation Level Material Consumption? | | | |
| 4 | Do you offer standard products or configured products? | — | | | |
| 5 | Do you use alternate parts/items both manufactured and procured? | Usage of Alternate Parts? | | | |
| 6 | Do you replace component materials in BOM at a certain time (based on dates?) | BOM Effectivity Defined? | | | |
| 7 | Do you replace component materials in BOM based on depleting existing inventory first before using new material? | BOM Effectivity Defined? | | | |
| 8 | Can different lines be configured to execute the same manufacturing order? | Alternate Routings? | | | |
| 9 | Do you pose restriction on the size of mfg. orders? Do you do lot sizing for manufacturing orders? | Lot Sizing/Consolidation for Mfd. Parts? | | | |
| 10 | Do you do time based consolidation of manufacturing orders? | Lot Sizing/Consolidation for Mfd. Parts? | | | |

Execution Checklist

EXECUTION: Initiation Stage

Save & Upload to Progress Report

900

| Check Box | Activity | Involved | Tool | Deliverable |
|---|---|---|---|---|
| ☐ 1. (eI1) | Establish Project Organization & Logistics | • Organization Project Manager<br>• Organization IT<br>• Partner | • Deployment Toolkit | • Project Management Documentation |
| ☐ 2. (eI1) | Establish Project Scope | • Organization Project Manager<br>• Organization IT<br>• Partner | | • Project Management Documentation |
| ☐ 3. (eI1) | Prepare Risk Assessment Plan | • Organization Project Manager<br>• Organization IT<br>• Partner | | • Risk Assessment Plan |
| ☐ 4. (eI1) | Establish Communication Plan | • Organization Project Manager<br>• Organization IT<br>• Partner | | • Communication Plan |
| ☐ 5. (eI1) | Establish Roles and Responsibilities | • Organization Project Manager<br>• Organization IT<br>• Partner | | • Project Management Documentation |

BACK

*FIG. 16*

Configuring the Spec File

1200

☑ Record Mandatory?

| Option | Bill of Material Fields | Description |
|---|---|---|
| ☐ | produced_part_number | produced part |
| ☐ | produced_quantity | produced quantity |
| ☐ | produced_quantity_uom | UOM |
| ☐ | routing | name of the routing used. |
| ☐ | operation | Name of the operation |
| ☐ | consumed_part_number | item or part which is consumed |
| ☐ | consumed_quantity | Quantity of the part to consume |
| ☐ | consumed_quantity_uom | UOM |
| ☐ | ecn_code | Code which defines the type of substitution - alternate part, used up part, replacement part |
| ☐ | ecn_date | The date at which the substitution becomes effective |
| ☐ | ecn_level | Defines a priority of the substitute parts |
| ☐ | ecn_number | Name to tie a group of parts together |

FIG. 20

Configuring Spec File

| bill_of_material_data | | | | | | | | | | | | |
|---|---|---|---|---|---|---|---|---|---|---|---|---|
| mode:read | | | | | | | | | | | | |
| Optional:True | | | | | | | | | | | | |
| Bill_Of_Materials_Record: | #produced_part_number, | #produced_quantity, | #produced_quantity_uom, | #routing, | operation, | #consumed_part_number, | #consumed_quantity, | #consumed_quantity_uom, | #ecn_code, | #ecn_date, | #ecn_level, | #ecn_number, |

Server Flag Configuration

Planning Policy Server Flags

1300

| | PROCUREMENT RELATED FLAGS | VALUE |
|---|---|---|
| 1 | lpst_based_procurements | FALSE |
| 2 | po_lateness_tolerance | 0 |
| 3 | default_vendor_supply_qty | 9999999 |
| 4 | po_versus_procure_tolerance | |
| 5 | show_po_number_os_source | TRUE |
| 6 | lot_sized_procurement_anchor_day | |
| 7 | lot_sized_procurement_anchor_date | |
| 8 | lot_sized_procurement_anchor_time | |
| 9 | lot_sized_procurements_display | TRUE |
| 10 | procurement_id_prefix | PROC |
| 11 | procurement_persistence | TRUE |
| 12 | save_all_procurements | TRUE |
| 13 | unobtainable_procure | TRUE |
| | INVENTORY ASSIGNMENT RELATED FLAGS | |
| 1 | jit_part_reservations | TRUE |
| 2 | delay_to_late_reservation | TRUE |
| 3 | part_assignment_algorithm | sort_due_date_priority_quantity |
| 4 | ia_post_processing | TRUE |
| 5 | all_or_nothing_inventory | TRUE |
| 6 | ia_allow_post_processing_lateness | TRUE |
| 7 | ia_post_processing_ignore_supply_type | TRUE |

FIG. 22

SOFTWARE DEPLOYMENT SYSTEM AND METHOD

RELATED APPLICATIONS

This application claims the benefit under 35 U.S.C. § 119(e) of U.S. Provisional Application No. 60/296,601 filed Jun. 7, 2001.

This application is related to copending U.S. application Ser. No. 10/163,782, entitled "Business Modeling Tool" and U.S. application Ser. No. 10/164,448, entitled "Software Valuation Simulation Tool."

TECHNICAL FIELD OF THE INVENTION

This invention relates to the field of software, and more particularly to a software deployment system and method.

BACKGROUND OF THE INVENTION

Recently, large advances have been made in providing businesses with software solutions covering practically the entire operating environment of a business, including customer and supplier relationship management and supply or value chain management. However, the price of this increased functionality is the complexity of deploying (selling and implementing) this software in the business environment. This complexity of deployment affects the ability of software vendors to deploy these solutions quickly and to ensure that both physical and intellectual ownership of the software is transferred to the customer. As an example, the cost of deploying this business software is often as much as the cost of the license to use to the software. Although large businesses may be able to absorb this deployment cost and realize the significant savings provided by the software once deployed, most small- to medium-sized business cannot afford this deployment cost. For a business software vendor to be successful in the low end of the market, there need to be significant cost and time reductions in the traditional business cycle of selling and implementing business software.

SUMMARY OF THE INVENTION

According to the present invention, disadvantages and problems associated with previous software deployment techniques have been substantially reduced or eliminated.

According to one embodiment of the present invention, a method for deploying software includes selecting one or more pre-defined business models applicable to a business entity in which the software is being deployed. The business models are associated with particular business functions. The method further includes creating an entity model using the one or more selected business models. In addition, the method includes gathering information from the entity relevant to the selected business models and inputting the information into the entity model. The method further includes specifying functional requirements of the entity using a business modeling tool and configuring the entity model using the specified functional requirements. Moreover, the method includes automatically generating one or more specification files according to the configured entity model. The specification files identify the data to be input to the software after the software is deployed.

Particular embodiments of the present invention may provide one or more technical advantages. Embodiments of the present invention implement the idea that selling and implementing phases of software deployment are inextricably linked and that substantial gains may be made in deployment productivity through the application of specific tools used according to a unique deployment methodology designed to reduce complexity of deployment and that begin the implementation process during the software sales phase. These tools and methodology reduce the implementation cycle time and allow for easier and faster deployments with less skilled human resources. Furthermore, quality controlled implementations ensure consistency and repeatability of software deployments.

Other technical advantages may be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 5 illustrates an example activity checklist for a milestone of the milestone chart illustrated in FIG. 4;

FIG. 6 illustrates an example prospect qualification tool interface;

FIG. 8 illustrates an example value assessment tool interface;

FIG. 13 illustrates an example inquiry session interface;

FIG. 15 illustrates an example milestone chart associated with the execution phase of the deployment process;

FIG. 16 illustrates an example activity checklist for a milestone of the milestone chart illustrated in FIG. 15;

FIG. 20 illustrates an example bill of materials record configuration interface;

FIG. 21 illustrates a portion of an example configured specification file relevant to bill of materials data;

FIG. 22 illustrates an example server flag configuration interface; and

DESCRIPTION OF EXAMPLE EMBODIMENTS

Figure 1:
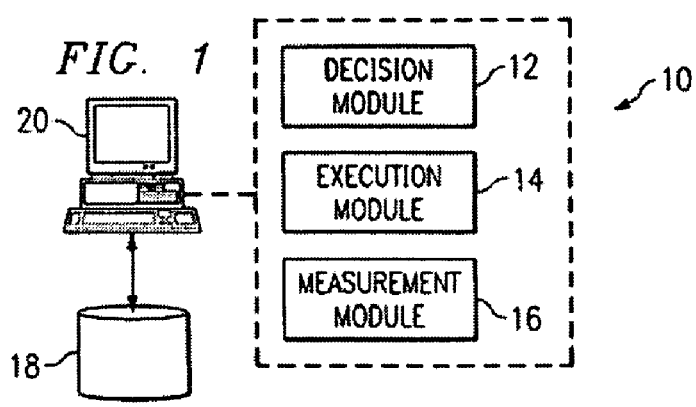
FIG. 1 illustrates an example software deployment system.

FIG. 1 illustrates an example deployment system 10 that may be used to sell, implement, and evaluate the performance of a variety of different business software. Deployment system 10 uses a bundled set of unique business cases, tools, and business knowledge that are used in association with a novel deployment methodology to assist a user in performing the above functions in an efficient and uncomplicated manner. The methodology is divided functionally into three different phases that correspond with phases of the software business cycle. Deployment system 10 includes a module that implements and is associated with each of these phases. These modules include a decision module 12 (associated with a sales phase of the business cycle), an execution module 14 (associated with an implementation phase of the business cycle), and a measurement module 16 (associated with an evaluation or value determination phase of the business cycle).

Modules 12, 14, and 16 may be implemented as any appropriate combination of software and/or hardware located at one or more locations. For example, modules may be software operating on one or more computers 20. Furthermore, the various functions of modules 12, 14, and 16 may be separated or may be integrated. Therefore, although three example modules 12, 14, and 16 are described and particular functions are associated with each module, the various functions may be implemented using any suitable number of modules and functions described as being performed by one module may be performed by any other suitable module in whole or in part. Furthermore, one or more of these functions or modules may not be included in system 10 in particular embodiments. For example, system 10 may not include measurement module 16 in particular embodiments. Modules 12, 14, and 16 may access the business cases, tools, knowledge (for example, interactive training materials), and other objects used to implement the deployment methodology described below. These business cases, tools, knowledge, and other objects may be stored in one or more data storage locations 18 located locally and/or remotely to modules 12, 14, and 16.

A variety of different tools may be included in deployment system 10. These tools include, but are not limited to, decision support tools allowing easy navigation by a user through the deployment process, qualification tools that allow a user to determine the suitability of particular software for a particular business, value calculators that allow a user to determine the potential value that may be provided by particular software to a business, data integrity and analysis tools, process-based business models coupled to configuration wizards, pre-configured methodology components (such as milestone charts including activities, deliverables and templates) that are linked to the business cases (described below), and solution configurators used to generate data models for the business software being deployed.

A user accesses system 10 to initiate the deployment of one or more software solutions (and more specifically the decision phase of the deployment cycle). During the software deployment process, one or more different users may access and use system 10 from one or more locations. As an example, a representative from the business in which the software is to be deployed may access deployment system 10 remotely to begin the sales phase and a representative from the company selling the software may later come to the business to finish the sales phase and to perform the implementation phase. The representative from the software company may bring system 10 to the business (for example, in the form of software loaded on a laptop computer) or may access deployment system 10 remotely. In any of these cases or any other appropriate cases, the person or person accessing system 10 are referred to herein as "users."

In an example deployment process using deployment system 10, a business prospect may be directed to the software provider's web site and directed to use qualification and value assessment tools and computer-based training (CBT) to determine which software solutions offered by the software provider are appropriate for the business. This process may be done independently by a user from the business or in conjunction with a liaison from the software provided who locally or remotely assists the user (for example, using MICROSOFT NETMEETING™ or other suitable software).

Once the prospect is "qualified" and interested in particular software solutions, one or more representatives of the software provider may visit the business and use appropriate business cases and associated tools to assess the functional suitability of the software solutions for the business prospect. This suitability determination may begin, in an example deployment process, with a determination of the business case and associated business topology that are relevant to the business prospect. The use of predefined business cases is different from past deployment processes in which a software solution was tailor-made for a particular business. These past deployments typically involved extensive design and business analysis in which skilled consultants designed a complete software solution from scratch specific to a particular customer. Unlike these tailor-made solutions, the businesses cases provided by system 10 include pre-defined software solutions that a business can choose and configure using system 10.

A business case includes a business model containing pre-selected functional elements and one or more business processes to support particular business process functionalities. For example, a business case may support capacity balancing (which is a sub-set of factory planning) or volume-based forecasting (which is a sub-set of demand planning). Multiple business cases may be bundled into a "business release." For example, a business release associated with factory planning might contain business cases having business models that support functions such as alternate parts, capacity balancing, indented bill of materials, and revision control. A software vendor may create a number of different business cases associated with the various functionalities included in the software solutions provided by the vendor. Once the various business cases are created, the business cases are stored in one or more data storage locations 18. As described below, the business cases may be grouped into business releases by business topology, industry vertical, and/or any other appropriate grouping.

A representative of the software vendor or other appropriate users may then select specific business releases and demonstrate the features of these business releases to the prospect. The business model or models associated with the business release copied out of an appropriate data storage location 18 and tagged with a prospect identifier to creating a prospect-specific "prospect model." The representative or other user may then gather information about the prospect and input particular business requirements, functions, processes that are specific to the prospect by completing one or more data inquiry sessions. After the prospect model is "filled in" with prospect-specific data, it is saved and stored in an appropriate data storage location for possible use in the implementation phase of the deployment cycle. Once this is performed for all appropriate business releases (if more than one are appropriate), the sales phase may end by the prospect deciding to purchase (or likely license) the software solutions used to implement the business releases.

Once the prospect becomes a customer, the implementation phase of the deployment cycle may begin. At this point, an implementation team of one or more consultants or other representatives of the software vendor or one of its partners return to the customer's site to implement the software (these consultants or other representatives will often be different people than those who sold the software during the sales phase). The previously saved prospect model is retrieved from data storage location 18 and reviewed by the implementation team to determine the software solutions agreed to in the sales phase. Since customer-specific data was gathered during the sales phase, this information is able to be used by the implementation team to quick-start the implementation process. The implementation team reviews the previously-gathered data and begins the model configuration process by drilling down to the specific business process flows in the model and choosing the configurations that are required based on requirements of the customer, as described below. Furthermore, planning policies are reviewed, and configurations are selected. The result of this implementation process is a configured software solution and the specification files or other files that are needed to generate data for the licensed software engines to perform their functions.

After the appropriate software solutions are implemented at the customer site, the customer may begin using the software solutions in its business. At various times during this operation, the customer may wish to evaluate the performance of the software and/or determine the value being provided to the customer by the software. This evaluation phase of the deployment cycle may also be performed using system 10 (for example, using module 16) and one or more tools may be provided locally and/or remotely to the customer using system 10 to allow such evaluation.

The sales and implementation phases and the associated tools used to implement the phases will be described in further detail. A similar methodology may be used to implement each of the phases. As described below, this methodology includes the use of various business interfaces allowing a user to graphically select particular functions and processes in which they are interested, milestone charts including milestones to be completed during a particular phase, and activity checklists identifying the activities to be completed for each milestone (various tools and templates may be provided by system 10 to assist the user in completing the activities and these tools may be accessible from the activity checklists and/or milestone charts). Each phase may be divided in one or more stages and each stage may have an associated set of milestones.

As an example only, the sales phase may be divided into three stages: an orientation stage, a business analysis stage, and an agreement stage. Each of these stages has associated milestones and activities; however, these milestones and activities will likely differ depending on the business case in which the business prospect is interested. System 10, and more specifically decision module 12 in particular embodiments, may provide the user with one or more user interfaces that allow the user to select the appropriate business case.

Figure 2:
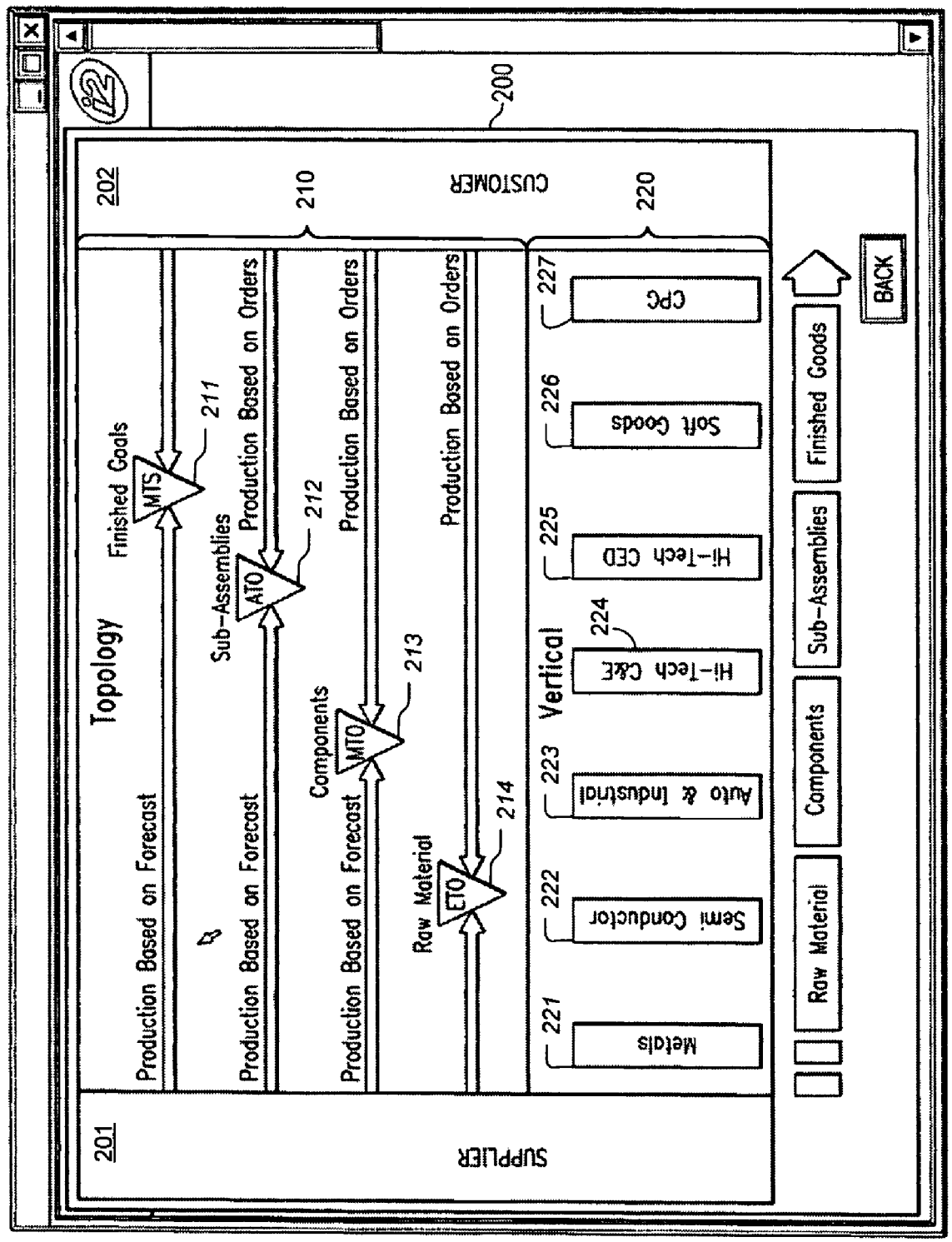
FIG. 2 illustrates an example business configuration user interface.

FIG. 2 illustrates an example business configuration interface 200 that may be used to select a business configuration that is appropriate for the customer. The example business configuration interface 200 provides supplier 201, customer 202, a number of business topologies 210, and industry verticals 220 that may each be associated with a particular business configuration. As an example only, the business topologies 210 used may be different types of manufacturing environments that a business might use, such as make-to-stock (MTS) 211, assemble-to-order (ATO) 212, make-to-order (MTO) 213, and engineer-to-order (ETO) 214. Each of these environments has a different set of business models and process; however, the user only has to know what type of manufacturing environment the customer is using and not the specific business models and process involved in order to select and configure an appropriate software solution. Similarly, various types of industry verticals 220, such as metals 221, semiconductors 222, automobile and industrial 223, hi-tech C&E 224, hi-tech CED 225, soft goods 226 and CPG 227 may be included in interface 200. Again, industry verticals 220 each have a different set of business models and process; however, the user only has to know what type of vertical the customer belongs to and not the specific business models and process involved in order to select and configure an appropriate software solution.

When the user has indicated to system 10 that the user wishes to begin the decision phase, the user is presented with interface 200 (interface 200 may be communicated to the user either remotely or locally). As an example, decision module 12 may communicate interface 200 to the user. The user then determines an appropriate topology 210, industry vertical 220, or any other appropriate representation of a business' configuration or other characteristics and communicates this selection to system 10.

Figure 3:
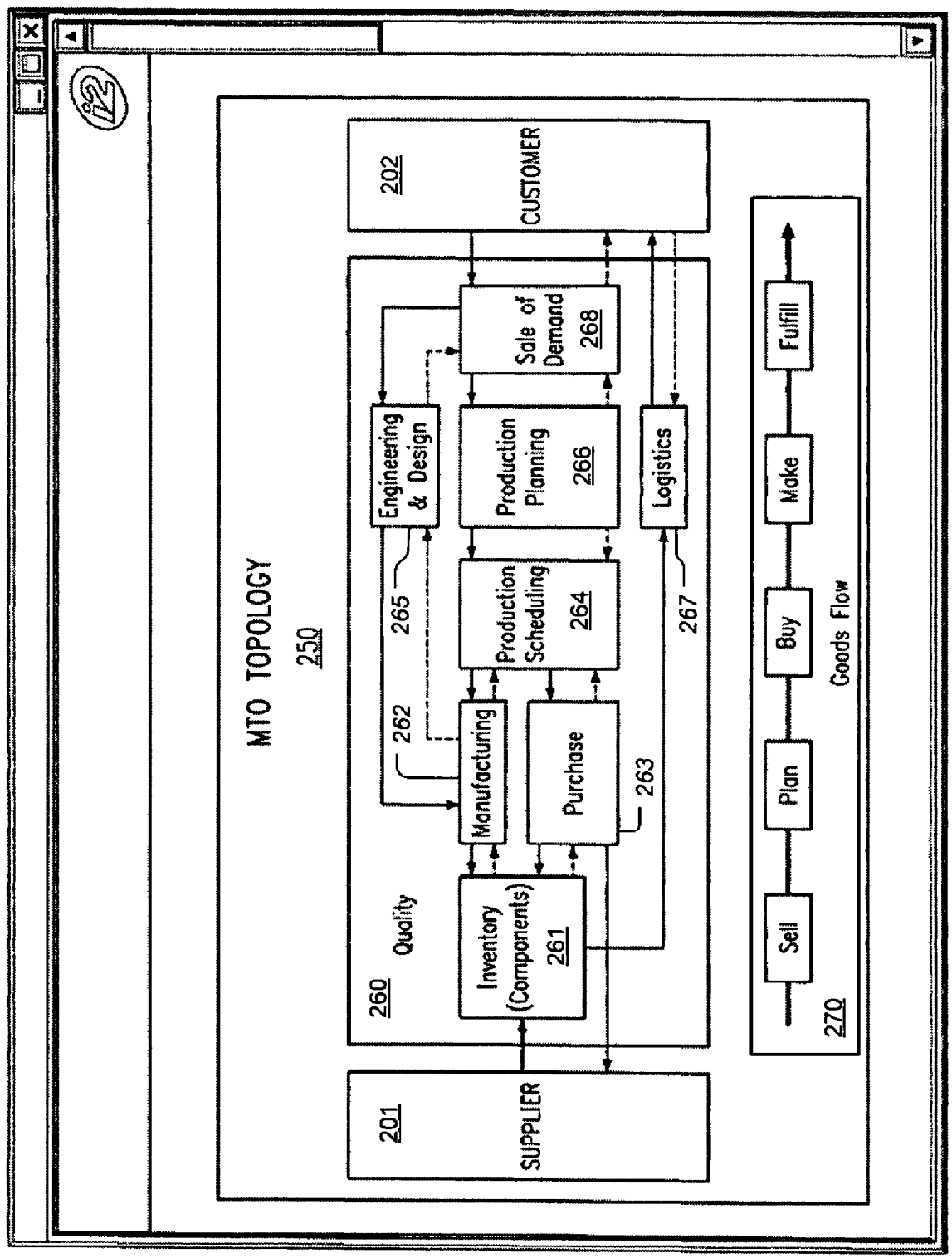
FIG. 3 illustrates an example business topology user interface.

FIG. 3 illustrates an example business topology interface 250 that is communicated to the user upon selection of a business configuration. The example business topology interface represents a business configuration associated with MTO 213 manufacturing environment and may be communicated to the user in response to the user's selection of the MTO 213 topology in business configuration user interface 200. Business topology interface 250 includes a number of functional elements 260 that are involved in the selected topology and the interaction of these various functional elements 260. For example, an MTO environment may include supplier 201, customer 202, inventory 261, manufacturing 262, purchasing 263, production scheduling 264, engineering and design 265, production planning 266, logistics 276, sale of demand 268, and any other appropriate functional elements 260 that are performed in the MTO environment. One or more of these functional elements 260 may have an associated business release through which software may be deployed to perform the functional element 260.

Functional elements 260 are illustrated in example business topology interface 250 in a block diagram to show their relative position in a workflow between a supplier 201 and a customer 202 and to show the interaction of different functional elements 260. This interaction is depicted in example business topology interface 250 using arrows. The solid arrows depict an input from either an external agent or between functional elements 260 themselves. The dotted arrows depict an output from one functional element 260 to another. It is common practice that two arrows are used to show the information flow between functional elements 260 (a functional element 260 will often have an input and an output).

Furthermore, functional elements 260 may be color-coded to correspond to different stages in an example goods flow 270 associated with the MTO environment or other appropriate topology communicated to the user in interface 250. Functional elements 260 may also be highlighted or otherwise differentiated if they have an associated business release. Although functional elements 260 are illustrated in a block diagram format to illustrate their position in the workflow and to show their interaction with other functional elements 260, interface 250 may simply provide a list of the functional element 260 relevant to the selected business topology 210 or industrial vertical 220 or otherwise communicate the relevant functional elements 260 to the user.

The two rectangles outside of the largest rectangle in business topology interface 250 are associated with what may be referred to as "external agents." An external agent captures the external interaction with third party entities, which in this example are customers 201 and suppliers 202. These external agents are not modeled, however the functional interaction to the internal business environment is clearly depicted and illustrates the business prospect's interaction with supply chain partners.

When the user has indicated the selection of a particular business configuration to system 10, the user is presented with business topology interface 250 (interface 250 may be communicated to the user either remotely or locally). As an example, decision module 12 may communicate business topology interface 250 to the user. The user then determines a functional element 260 the user wishes to investigate and/or configure and communicates this selection to system 10.

Figure 4:
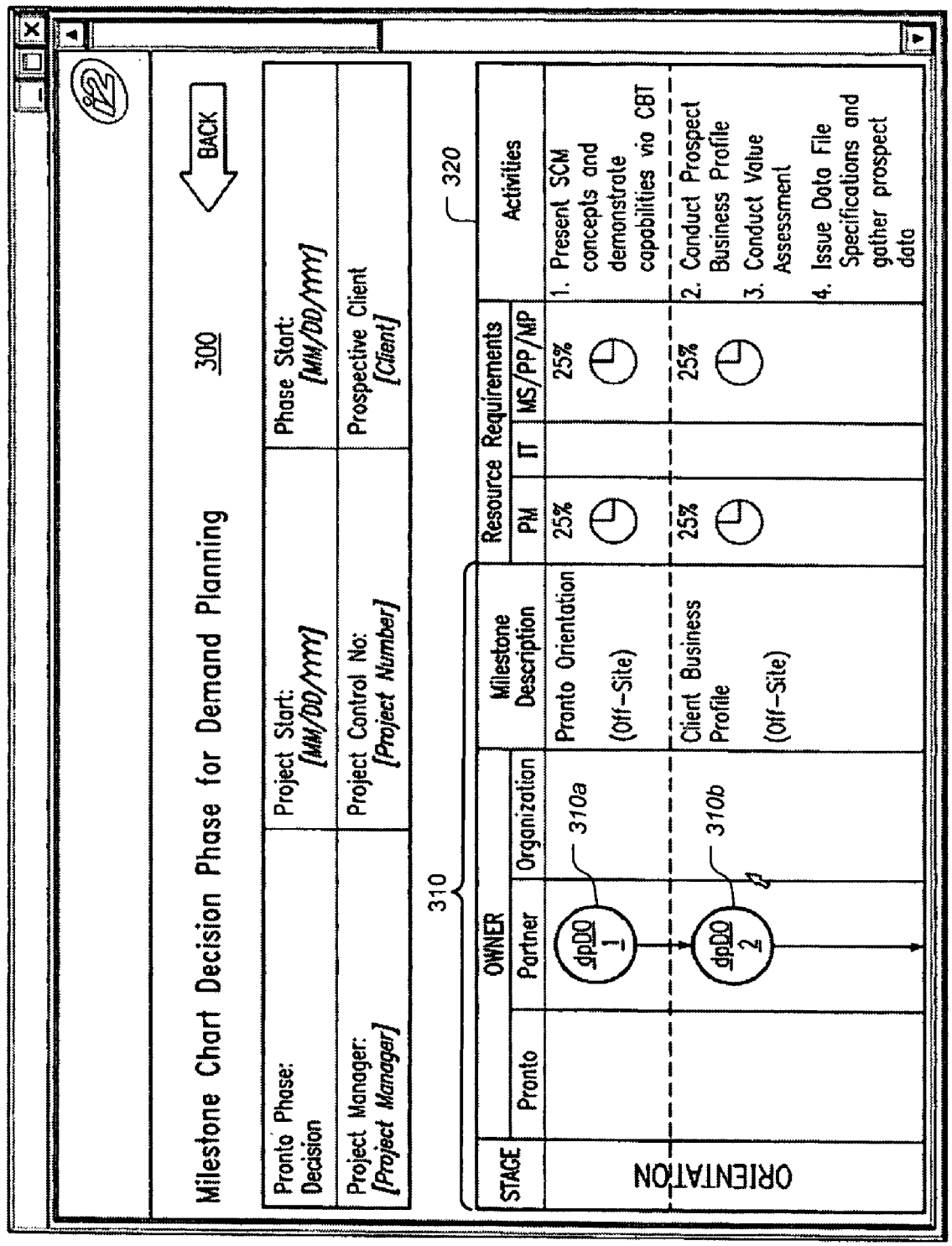
FIG. 4 illustrates an example milestone chart associated with the decision phase of the deployment process.

FIG. 4 illustrates an example milestone chart 300 associated with a demand planning functional element 260. Since the user is in the decision phase of the software deployment cycle, the example milestone chart 300 is for the decision phase associated with the demand planning functional element 260 (which, as an example, the user selected using interface 250). As described below, milestone charts may be used for all (or most) of the phases of the software deployment cycle and provide a step-by-step, goal-directed approach to software deployment that allows users of varying skill levels to successfully deploy software.

Milestone chart 300 includes a number milestones 310 associated with different stages of the decision phase. Milestone chart 300 further includes milestone dpDO1 310a and milestone dpDO2 310b. Milestones 310a and 310b are listed in the order that they are to be performed. Each milestone 310 has one or more associated activities 320 that are to be performed to complete the milestone. For example, the first milestone 310 is "Orientation" and the associated activity 320 is for supply chain management (SCM) concepts and capabilities to be demonstrated to the customer using computer based training. As described above, this activity may be performed remotely by customer 202 and no representative from the software vendor need be present. In addition to displaying activities 320 that are associated with a milestone 310, milestone chart 300 may also provide other appropriate information associated with milestones 310. For example, milestone chart 300 may identify the "owner" of a milestone (the entity responsible for its completion), the resources required to perform the milestone, and/or any other appropriate information.

FIG. 5 illustrates an example activity checklist 350 that may be accessible from milestone chart 300. Checklist 350 may include a checkbox 360 associated with each activity 320 that allows and a user to identify when a task has been completed. Furthermore, checklist 350 may include detailed information about an activity 320 (which may or may not be more detailed than the information provided in milestone chart 300) such as a detailed activity description, the entities involved in the activity, the deliverables from the activity, and/or any other appropriate information to aid the user in identifying and performing the activity. Activity checklist 350 may also include links 370 to one or more tools that may be used to complete an activity 320. For example, the activity "Complete Prospect Business Profile" has an associated link 370 to a prospect qualification tool that may be used to perform this activity 320. Examples of the tools that may be provided are described in further detail below.

FIG. 6 illustrates an example prospect qualification tool interface 400. Interface 400 may be provided by a prospect qualification tool that is initiated upon the selection of an associated link 370 in activity checklist 350. The prospect qualification tool may be integral to decision module 12 (and/or any other appropriate module) or it may be stored in a data storage location 18 and executed by decision module 12 (and/or any other appropriate module). For example, module 12 may execute the tool, which in turn initiates the communication of interface 400 and other appropriate interfaces associated with the prospect qualification tool to a user (for example, over the Internet).

The prospect qualification tool is used to obtain information from the prospect about its business to properly select and deploy appropriate software solutions. Interface 400 presents various questions to the user (for example, the prospect itself or someone helping the prospect complete the decision phase) and allows the user to select appropriate answers to the questions. For example, interface 400 may provide drop-down menu to allow the user to select the appropriate answer. Furthermore, any other appropriate techniques for presenting questions to the user and obtaining answers to the questions may also or alternatively be used. Although an example interface 400 is illustrated, it will be understood that many other interfaces for obtaining other types of information from the user may also or alternatively be used. After the user has communicated its answers to system 10, the answers are analyzed and weighted calculations may be conducted which allow a comparison of the prospect against an "ideal fit" with respect to particular dimensions or characteristics that are being measured.

Figure 7:
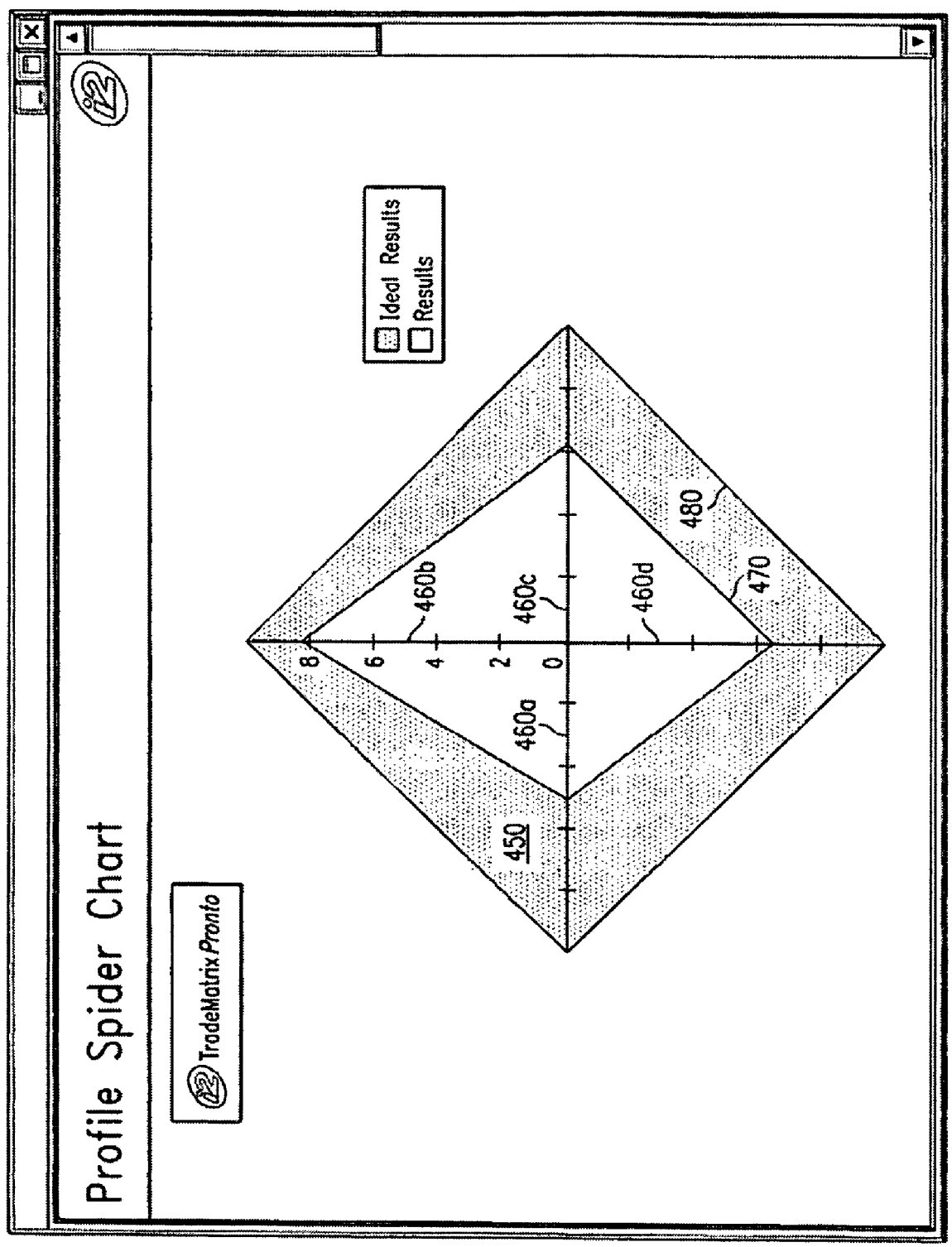
FIG. 7 illustrates an example customer profile spider chart.

FIG. 7 illustrates an example customer profile spider chart 450 that illustrates the result of an analysis of the answers provided by the user using the prospect qualification tool. The prospect's "score" in each of multiple dimensions 460 is shown in chart 450 along a scale that ends with the "ideal" score in each particular dimension. Furthermore, a prospect profile 470 may be illustrated to more clearly compare the prospect's scores in all of the dimensions to an ideal profile 480. In the example chart 450, it is clear that the example prospect has a poor score in the "data quality" dimension 460a. This low score may serve as an early warning signal and may automatically trigger further questioning of the prospect (using the prospect evaluation tool or any other appropriate technique) in relation to its data availability. This questioning may continue until it is determined that it is alright to move to the next activity or milestone or until it is determined that an appropriate software solutions is not available for the selected functional element (in this example, demand planning).

FIG. 8 illustrates an example value assessment tool input interface 500. After the prospect profile analysis is completed, the user may be directed to the next activity, which in example milestone chart 300 and activity checklist 350 relates to the determination of the potential value that will be provided to the prospect by the proposed software solution. Using interface 500, the user may input values for each of the questions that are asked. A case study may be provided to assist users who wish to use the tool remotely. Alternatively, the value assessment tool may be demonstrated to the prospect under remote supervision in order to position the concepts clearly and to set expectations accordingly. After answers have been received from the user though interface 500 and/or any other appropriate interfaces, the answers are used to calculate various value propositions that may be provided to the user using the software solutions. These value propositions may be presented to the user in various formats.

Figure 9:
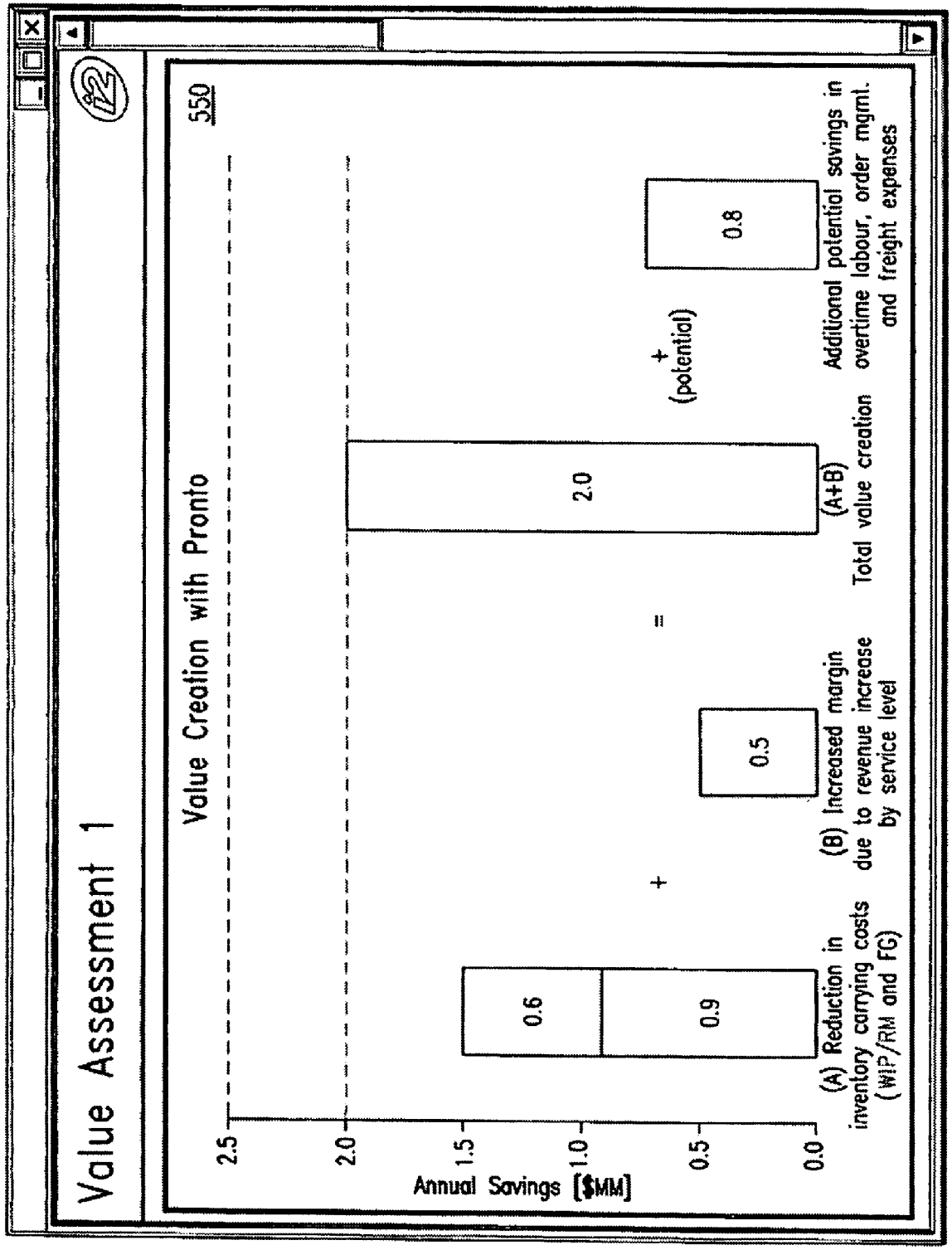
FIG. 9 illustrates an example value proposition graph.

FIG. 9 illustrates an example value proposition chart 550 identifying the annual savings that may be provided based on the answers provided by the user. Chart 550 indicates to the prospect the breakdown of value opportunity made possible by the software solution through reducing inventory carrying costs and increasing fill rates. Chart 550 also indicates potential savings accruing from other areas such as labor expense, order management improvement, and reduced freight expense. Chart 550 and/or other appropriate demonstrations of the value that may be provided by the software solution being sold by the software vendor assist the vendor in selling the software to the prospect by demonstrating specifically how the software will impact the prospect.

Figure 10:
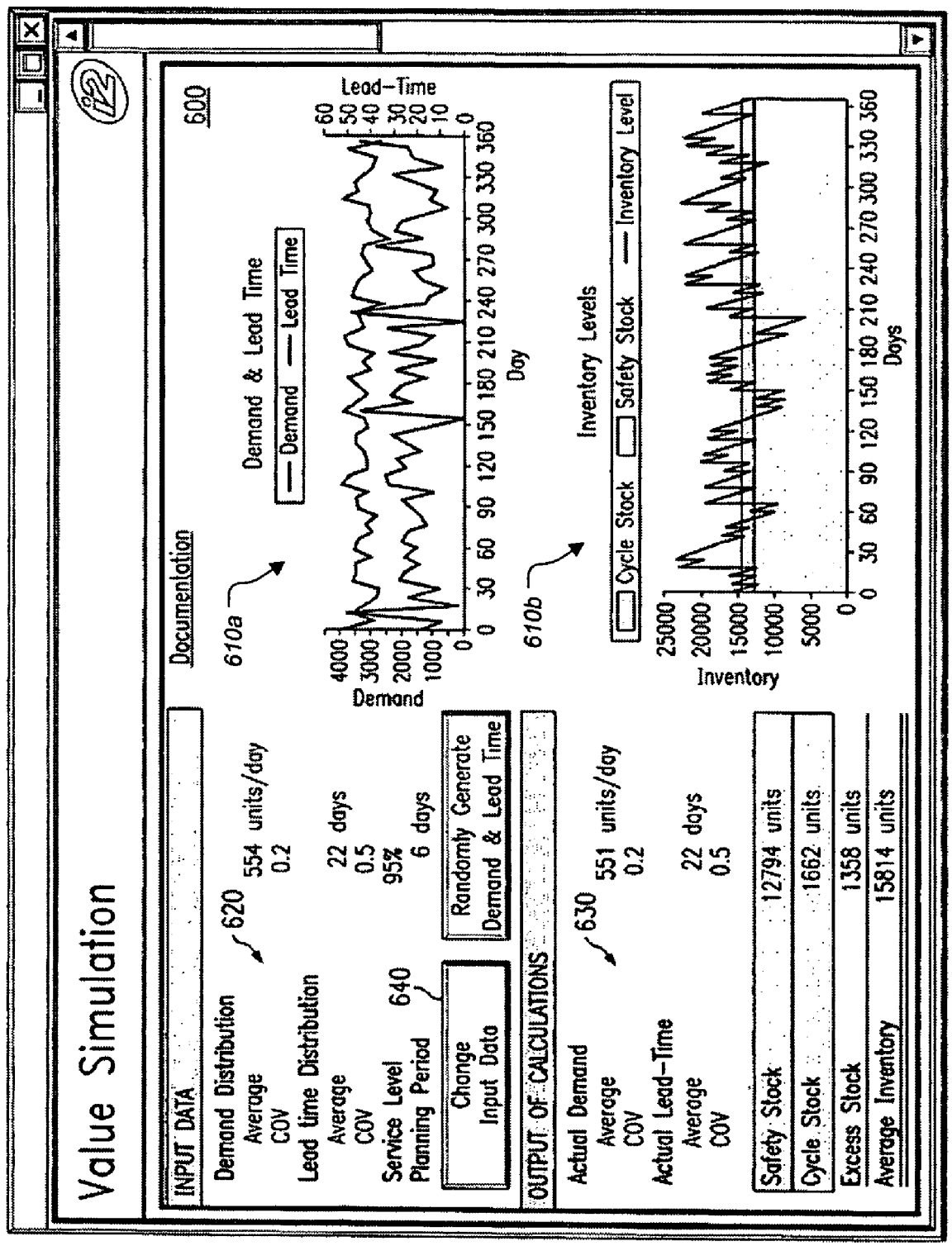
FIG. 10 illustrates a value simulation tool interface.

FIG. 10 illustrates a value simulation tool interface 600 that allows a user to interactively see the effect of varying the input provided by the user to the value assessment tool. Interface 600 may include more one or more graphs 610*a* and 610*b* or other displays identifying various business measures, such as demand and lead time graph 610*a* and inventory levels 610*b*, that are affected by the inputs provided by the user. Interface 600 may also show some or all of the input 620 provided by the user that affects the displayed parameters and the numerical output 630 of calculations performed using this input 620. Interface 600 may provide a link 640 to one or more other interfaces (for example, interface 500) that allows the user to change one or more of the previous inputs. Alternatively, the inputs may be changed directly in interface 600. Once the changed input is provided, the value simulation tool calculates the effect of the change on the displayed parameters and graphs 610*a* and 610*b* are updated to show the effect of the changes. This allows the user to easily determine the value of the proposed software solution given changing business conditions.

In addition to the prospect qualification and value simulation, system 10 may also provide for a data integrity analysis of the prospect's business data. For example, based on previous selections and input provided by the user, system 10 may communicate a data questionnaire to the prospect that identifies the type and format of data that will be required by the software solution. The prospect may then communicate one or more business data files to system 10 for analysis. System 10 may then provide feedback regarding changes that may be needed to the data files to enable them to be used by the software solution.

Upon the completion of the value simulation activity or any other appropriate "Orientation" phase activity, the user may proceed in the example milestone chart 300 from the "Orientation" phase of the "Decision" stage to the "Business Modeling" phase. The user may automatically be taken to the first activity in the "Business Modeling" phase or the use may initiate the activity by selecting a link to a business modeling activity or a deployment modeling tool. Since the user has previously selected the demand planning functional element of the MTO environment, the business modeling interfaces presented to the user, as described below, may automatically be associated with this functional element. Alternatively, the user may select a different functional element to configure. Furthermore, once the user has completed the modeling of one functional element in the "Decision" stage, the user may return to business configuration interface 200 and/or a particular business topology interface 250 to select additional functional elements to configure.

The example business model that is described herein has an architecture that includes four levels of decomposition, each level being represented by one or more diagrams. At the top level is the business topology diagram, such as the diagram presented in business topology interface 250. As described above, this diagram depicts the functional footprint of a typical business topology in which the prospect operates (for example, ATO, ETO, MTS and/or MTO). The second level in the model is represented using one or more functional element interaction diagrams (described in FIG. 11) that are each associated with a particular functional element 260 in the business topology. Each functional element 260 includes various business functions which are illustrated in the functional element interaction diagrams. The business functions may be further decomposed into core functions. The third level is represented using one or more functional decomposition diagrams (described in FIG. 12) that are each associated with a particular business function from a functional element interaction diagram and that identify the core functions of that business function. The fourth and lowest level of the business model is represented by one or more business process diagrams that are each associated with one of the core functions from a functional decomposition diagram. These business processes are described in further detail below with respect to the "Execution" phase of the deployment cycle.

Figure 11:
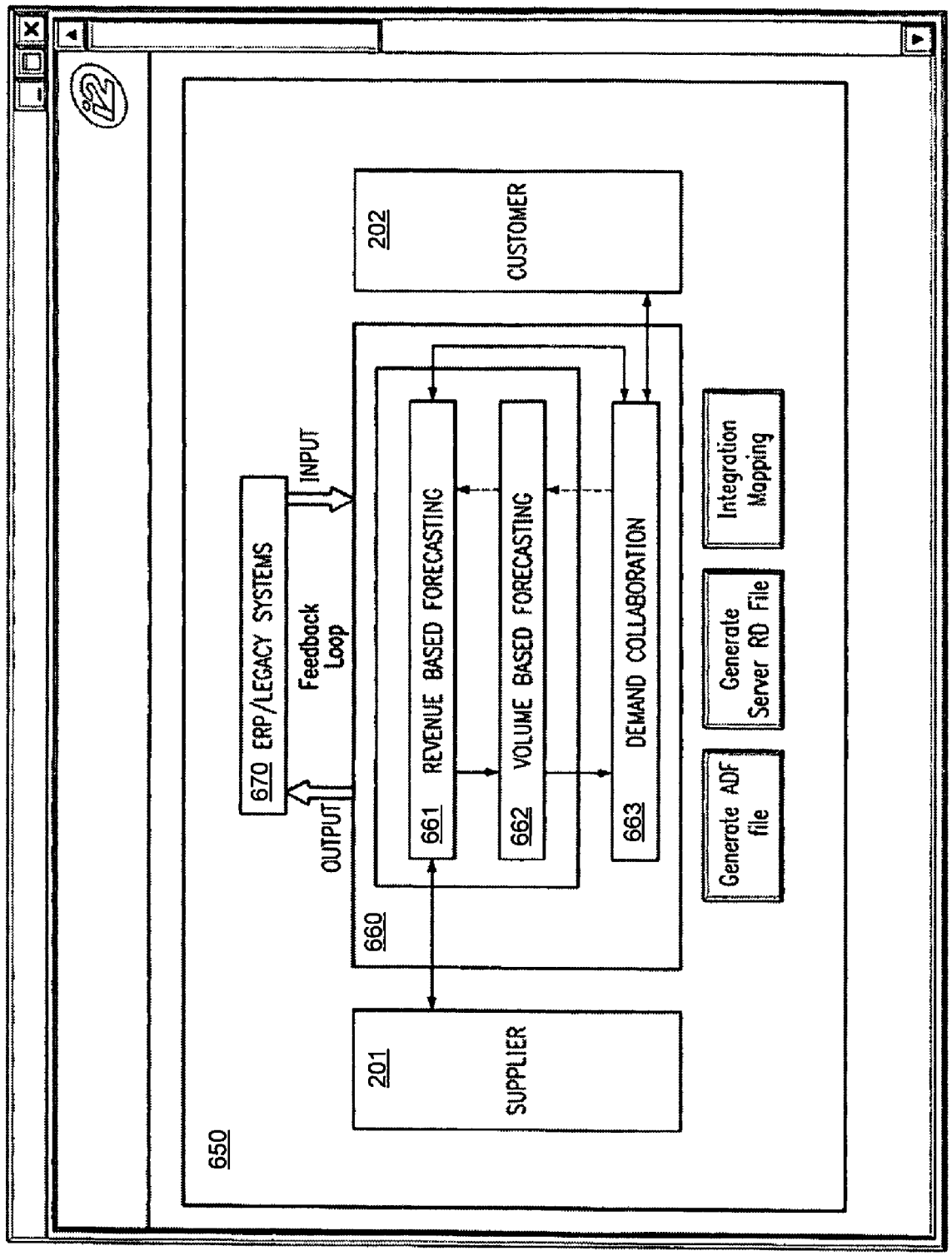
FIG. 11 illustrates an example functional element interaction interface.

FIG. 11 illustrates an example functional element interaction interface 650 that illustrates the business functions 660 included in a particular functional element 260. As an example only, interface 650 includes the business functions 660 included in a factory planning functional element 260 of an MTO manufacturing environment. Business functions 660 illustrates the functional boundary of the factory planning functional element 260. This boundary includes the business functions 660 of revenue-based forecasting 661, volume-based forecasting 662, and demand collaboration 663. In the example interface 650, there are three external agents: customer 202, supplier 201, and ERP/legacy systems 670. The arrows indicate the functional interaction between the external agents and business functions 660. In order to proceed with the business modeling process, the user proceeds to the next level in the business model by selecting one of the business functions 660 (for example the user may click in the associated rectangle in interface 650).

Figure 12:
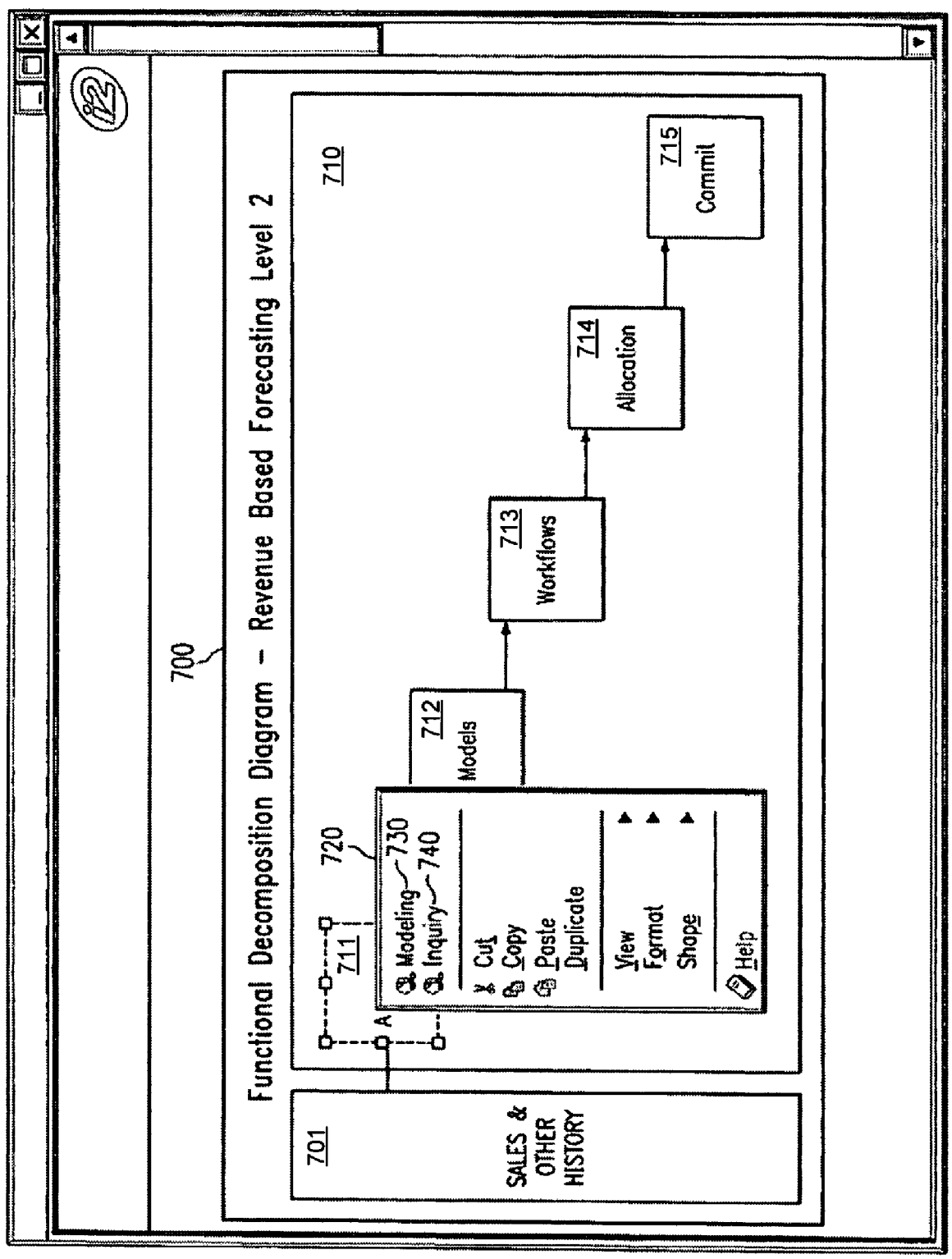
FIG. 12 illustrates an example functional decomposition interface.

FIG. 12 illustrates an example functional decomposition interface 700 for the revenue-based forecasting business function 660. As described above, the functional decomposition interface 700 includes sales and other history 701 and core functions 710 that make up a particular business function 660 (in this case, revenue-based forecasting). Core functions 710 further includes core functions 711–715. In order to assist the user in the translation of this business function 660 into execution of business processes, the model decomposes core functions 710 into one or more business process that reside at the fourth level of the business model. However, in the context of the decision stage of the deployment cycle, the model is used to extract enough relevant information from the prospect and to determine the suitability of various software solutions (business releases) for the prospect and to demonstrate to the prospect the manner in which the software conducts certain functions.

This process of obtaining information in the decision stage may be referred to as an inquiry session. Each core function 710 may have an associated inquiry session. In the example interface 700, the inquiry session associated with a particular core function 710 may be accessed by right-clicking or otherwise selecting at least one core function 710, which in turn brings up a menu 720. An "Inquiry" option 740 may then be selected to initiate the inquiry session (as will be described below, a "Modeling" option 730 may be selected in the Execution phase). Since the primary purpose of the business modeling effort in the "Decision" phase (the sales phase) is to conduct business analysis and data gathering to determine which software solutions are appropriate for the prospect, the user chooses the Inquiry option 740 in the Decision phase where the user will be presented with the opportunity to determine functional requirements and to pose deliberate questions regarding the functional elements being demonstrated to the prospect.

Each business function 660 may have an associated business case and multiple business functions 660 may be included in a single business case. A business case includes a business model containing pre-selected core functions 710. As will be described below in conjunction with the Execution phase, each business function 660 also includes one or more business processes to support particular business process functionalities. For example, a business case may support capacity balancing (which is a sub-set of factory planning) or volume-based forecasting (which is a sub-set of demand planning). Multiple business cases may be bundled into a business release that provides a total solution to the customer.

FIG. 13 illustrates an example inquiry session interface 750 that may be accessed from functional decomposition interface 700. Upon accessing the inquiry session the user is confronted with a series of questions 760 related to the core function from which the inquiry session was accessed (for example, using an associated menu 720). Questions 760 are structured to assist in the data gathering exercise and also as a first-level configuration tool for specification file and server flag settings, which are addressed in further detail below in conjunction with the Execution phase. One purpose of inquiry session interfaces 750 is to ensure consistency in the data gathering exercise and to ensure that once captured this information/data is made available to the team that eventually implements the software solution for review. This is unlike previous methods when different questions might be asked depending on the person(s) conducting the sales process and when the answers to these questions were often not effectively conveyed to the implementation team (thus requiring the implementation team the ask the questions again). This information also effectively defines the scope of the implementation and the customer's expectations.

A representative of the software provider may pose the question to the prospect, work with the prospect to ensure understanding of the questions, and assists the prospect in completing the inquiry session. Alternatively, the prospect may perform the inquiry session on its own. After one or more of the questions are asked of or reviewed by the prospect, the prospect's responses may then be entered using interface 750. For example, the responses may be entered in a response field 770 associated with each question. Furthermore, if appropriate, the type of available data related to a particular question 760 and the source of that data may also be entered in fields 780 and 790. It may also be possible to add electronic copies of particular data relating to a question 760. Once the user has completed an inquiry session, the user may conduct additional inquiry sessions for other core functions 710, business functions 660, or functional elements 260. Once the user has completed all desired tasks in the Decision phase, the user may them manually or automatically enter the Execution phase where the selected and pre-configured software solution is implemented.

As mentioned previously the techniques, tools, and methodologies in the Decision phase are primarily concerned about rapid, low-cost methods of selling and understanding the scope of a proposed implementation of a software solution. Embodiments of the present invention thus utilize tools and methods designed to begin the implementation process as early as possible (even before the product is sold). Once the Decision phase is completed, the prospect model created at the prospect site (based on the various information and data provided by the user) is saved and stored until an agreement to purchase the software solution is completed. Once a deployment team arrives at the prospect (now the customer) site, the prospect model is transferred to a "deployment model" and is used by the team as the basis for the deployment. However, the prospect model may be simply modified in some embodiments, and there is not necessarily a distinction between the prospect model and the deployment model in particular embodiments. The prospect model and deployment model may be individually or collectively referred to as an "entity model."

Figure 14:
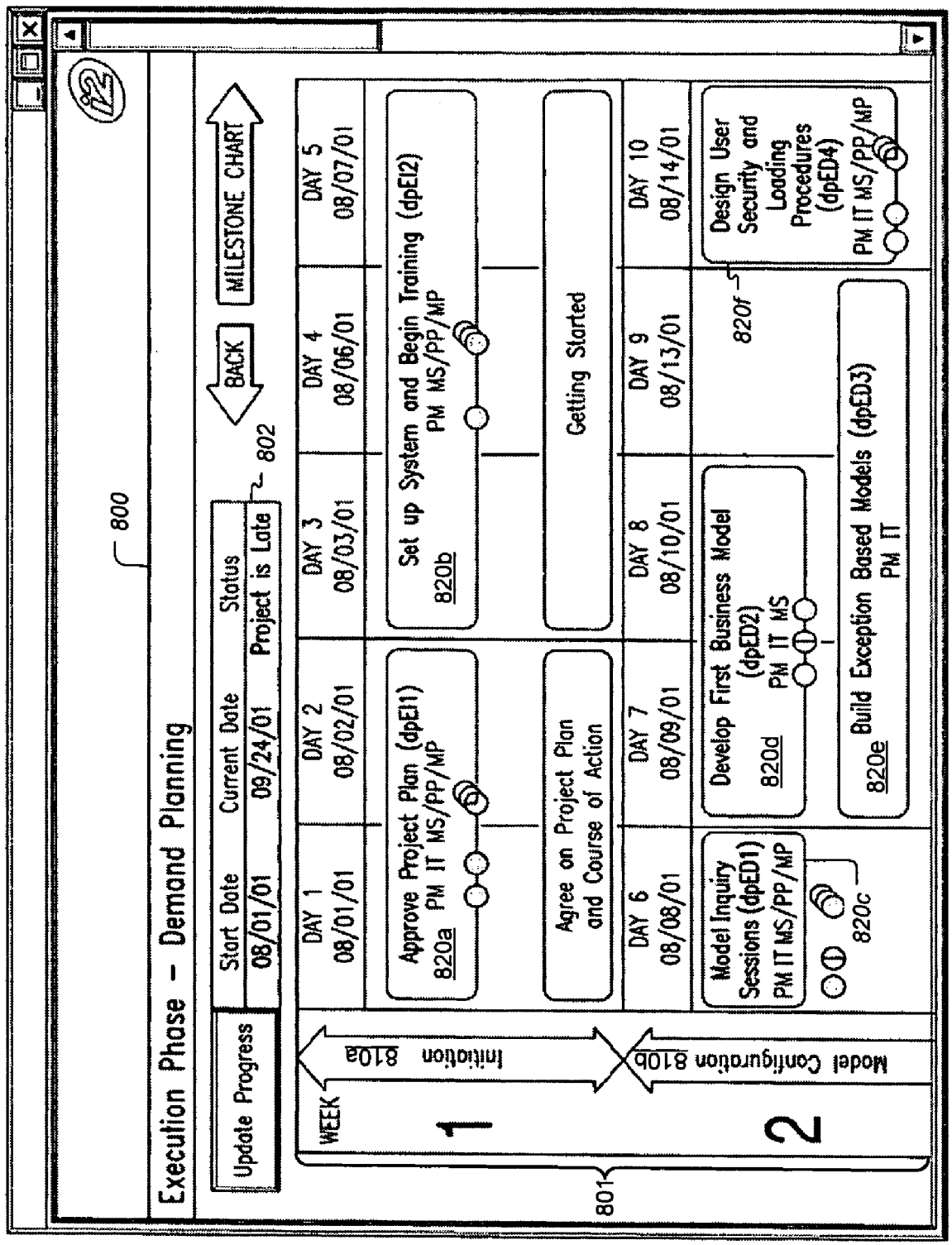
FIG. 14 illustrates an example project summary interface associated with the execution phase of the deployment process.

FIG. 14 illustrates an example project summary interface 800 depicting the Execution phase in stages with integrated timelines 801. The user may enter the start date of the Execution phase into progress block 802 and then as milestones are completed, the progress may be uploaded to this chart allowing a project manager to view progress on a daily basis. Although not described above, a similar project summary interface may be used for the decision phase and/or a similar project summary interface may be used for multiple phases of the deployment process. Project summary interface 800 displays the various stages 810*a*–810*b* in the execution phase and the milestones 820*a*–820*f* in each of stages 810*a*–810*b*. Project summary interface 800 provides a good overview of the entire project and gives the customer a good understanding of the degree of commitment required of its resources. The user may drill into project summary interface 800 for a particular time period and may be taken to the milestone chart for the particular period.

Figure 15:
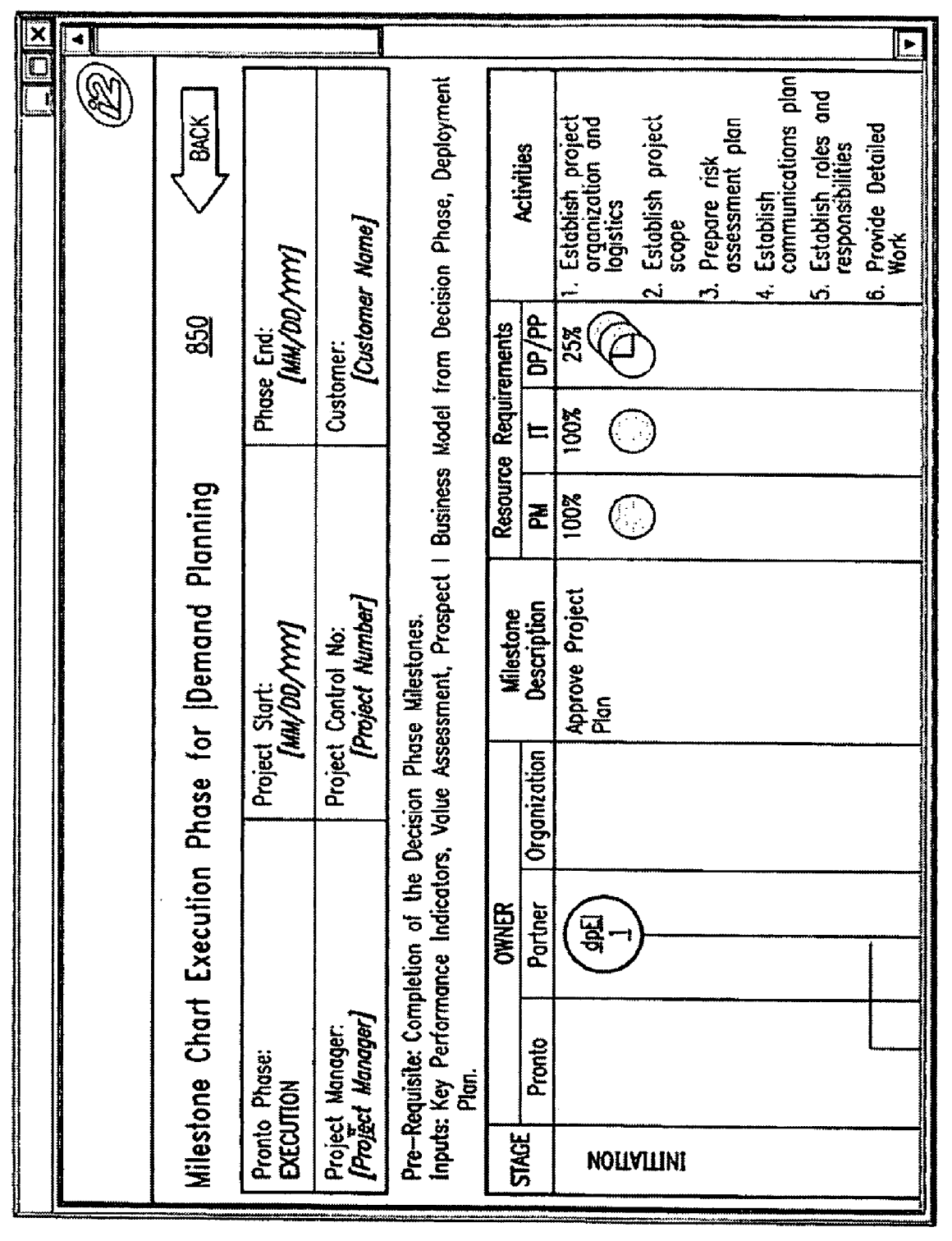

FIG. 15 illustrates an example milestone chart 850 for the Execution phase. Similarly to milestone chart 300, milestone chart 850 illustrates the milestones associated with each stage of the Execution phase and the activities included in each milestone. Since milestone chart 300 was described above in association with the Decision stage, milestone chart 850 will not be discussed in further detail.

FIG. 16 illustrates an example execution checklist 900 that may be accessed from milestone chart 850 and used to monitor completion of the various activities which make up a milestone (similarly to activity checklist 350, described above). As described above, checklist 900 indicates each activity, the responsibility for its completion, and the deliverable associated with the completion of the activity. In order to access the tools or templates associated with an activity, the user may select the link associated with activity and be directed to the appropriate tools or templates, as described above. Once the activities are complete and the check boxes are selected, the user can update the progress in project summary interface 800 by selecting the "save and upload progress" button at the top of checklist 900.

The example checklist 900 lists the activities associated with milestone "eI1." Once the project scope is discussed, risk assessment plan and communication plan developed, and roles and responsibilities defined, the user may typically recall the prospect model created during the Decision phase and begin the process of reviewing the data and configuration decisions which were captured in the Decision phase (for example, in the inquiry sessions).

The modeling process for a particular aspect of a software solution (such as for a particular business function 660 of a particular functional element 260) may be accessed using functional element interface 650 and functional decomposition interface 700, described above. As an example, it will be assumed that the user has used these interfaces 650 and 700 to select the revenue-based forecasting business function 660 to model. As described above in conjunction with FIG. 12, revenue-based forecasting business function 660 includes a number of core functions 710. Each core function 710 may have an associated inquiry session and an associated modeling session. In the example interface 700 illustrated in FIG. 12, the modeling session associated with a particular core function 710 may be accessed by right-clicking or otherwise selecting a core function 710, which in turn brings up a menu 720. A "Modeling" option 740 may then be selected to initiate the modeling session.

Figure 17:
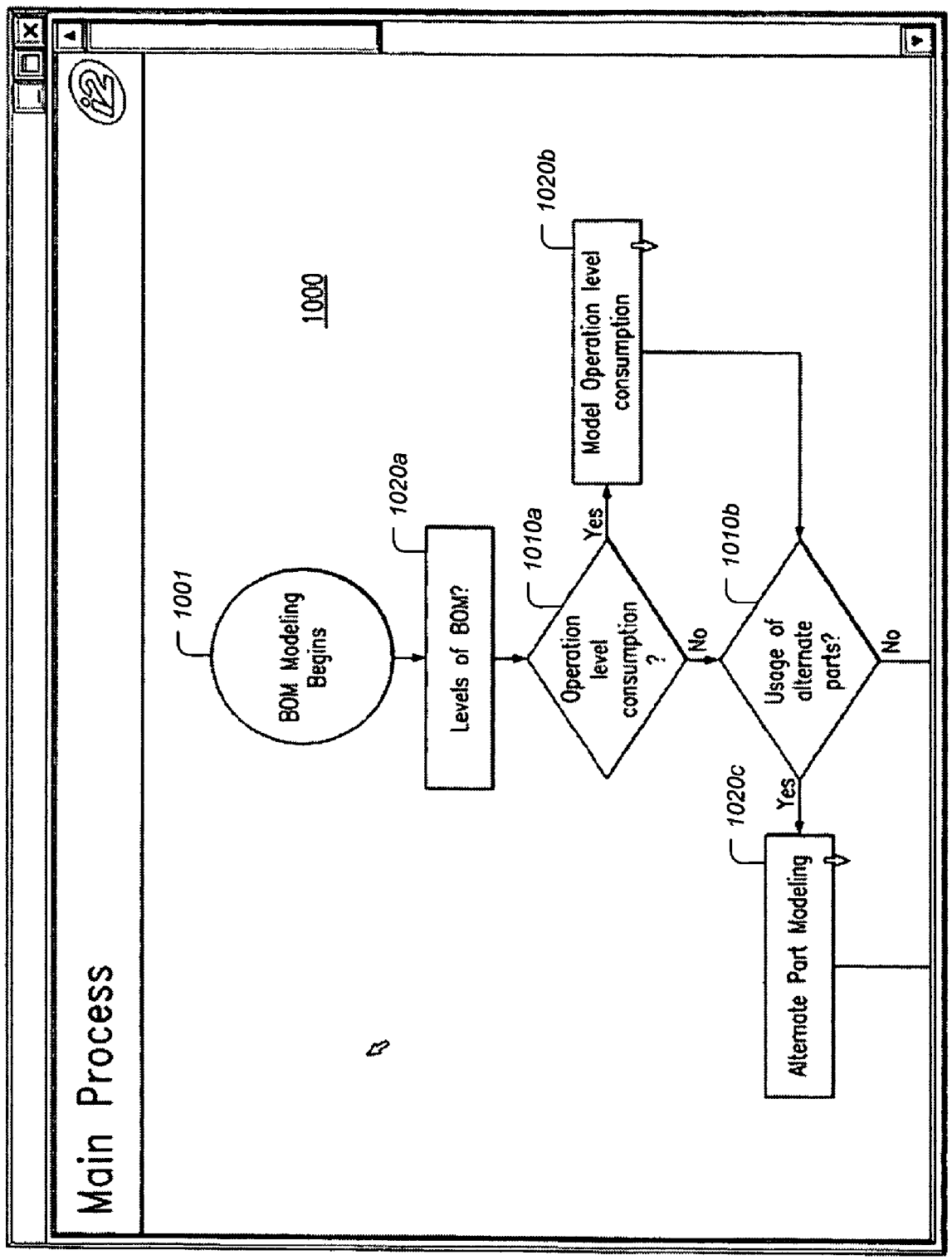
FIG. 17 illustrates a portion of an example business process interface used in association with the business modeling activity.

FIG. 17 illustrates a portion of an example business process interface 1000 used in association with the business modeling activity. In particular embodiments, there are two types of business processes in the model, main processes and sub-processes. A main process starts at the highest level of process definition and provides the user with a first pass at decision making. The example business process interface 1000 is associated with a bill of materials (BOM) core function 710. In the process, diamonds 1010a–1010b represent decision points and modeling activity rectangles 1020a–1020c represent the modeling activities associated with the selected core function. Each decision diamond 1010a–1010b may be configured for one input path and three output paths to provide AND, OR and XOR Boolean decision logic; however, any other appropriate configurations may be used. Upon reaching a decision diamond 1010a–1010b, a user may determine the answer to the question presented and go to the next appropriate activity rectangle 1020a–1020c or decision diamond 1010a–1010b. Alternatively, in particular embodiments, the user may select the correct answer to the question (for example, by clicking on "yes" or "no" arrows coming from a decision diamond 1010a–1010b) and the entire process as displayed to the user in interface 1000 may be modified as a result of the selected "path." For example, if the user selects "yes" to a question, the decision diamonds 1010a–1010b and/or activity rectangles 1020a–1020c in the path starting from the "no" arrow may be removed, dimmed, colored, or otherwise distinguished from the decision diamonds 1010a–1010b and/or activity rectangles 1020a–1020c in the selected path to indicate that the user does not need to make decisions or enter modeling input for this non-selected path. The model will then effectively no longer contain these options and associated modeling activities and sub-processes, described below. The user can also select activity rectangles 1020a–1020c that request information and provide this information to help configure the software.

In certain embodiments, two different types of activity rectangles 1020a–1020c may be included in a process, those having an underlying sub-process and those that do not have an associated sub-process. Activity rectangles 1020a–1020c having an associated sub-process may be identified in any appropriate manner. In the illustrated embodiments, such activity rectangles 1020a–1020c have shadowed borders and associated arrows. The associated sub-process for these activity rectangles 1020a–1020c may be accessed by right-clicking the activity rectangle 1020a–1020c or in any other suitable manner.

Figure 18:
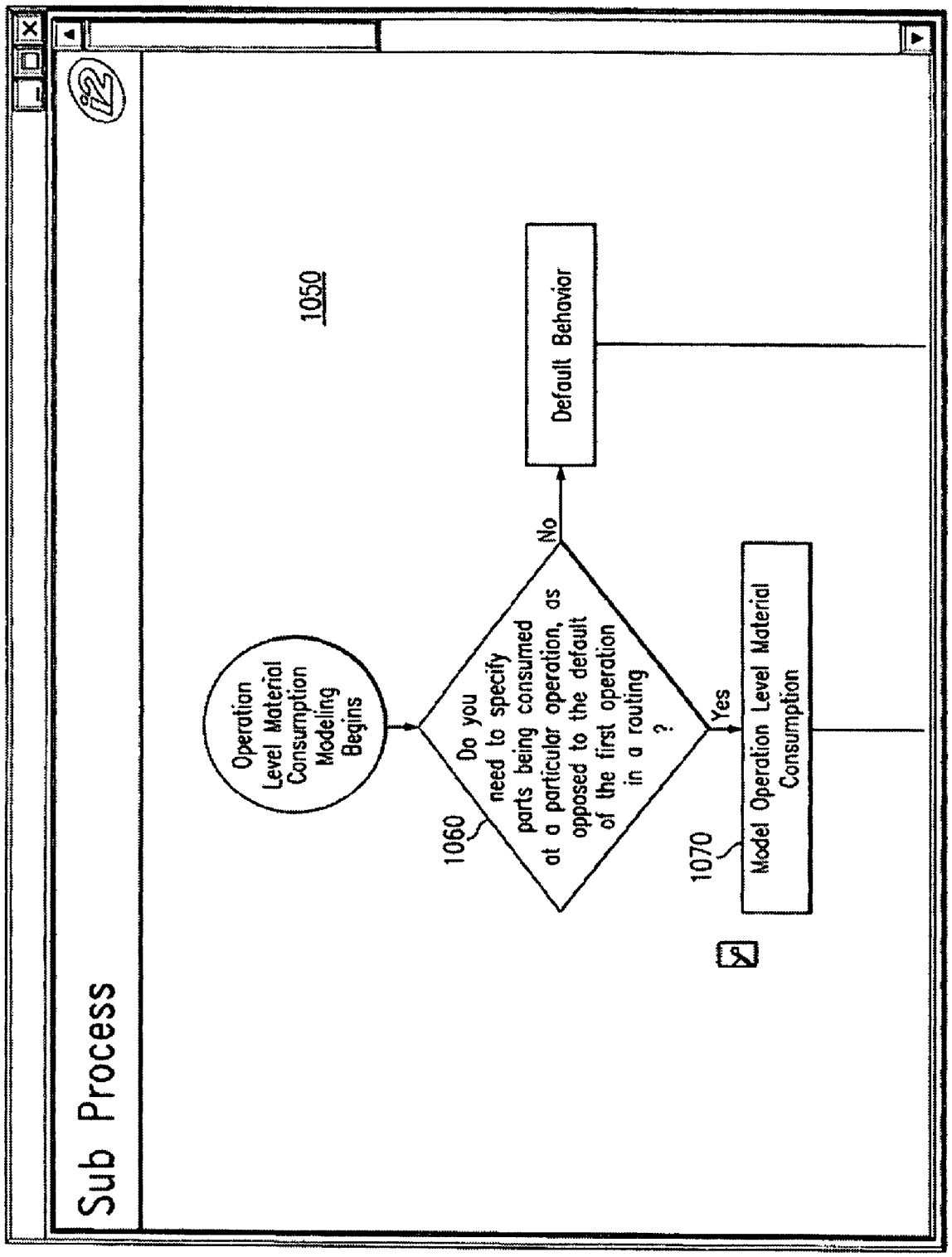
FIG. 18 illustrates a portion of an example business sub-process interface that may be accessed from the business process interface of FIG. 17.

FIG. 18 illustrates a portion of an example business sub-process interface 1050 that may be accessed from business process interface 1000. The sub-process is the lowest level of business modeling process. The example sub-process displayed in interface 1050 is for material level consumption modeling and may be reached from the BOM modeling process illustrated in FIG. 17. As can be seen, a decision to specify parts being consumed in the first decision diamond 1060 takes the user to a "Model Operation Level Material Consumption" activity rectangle 1070. In order to set the parameters in the software solution to do this the user needs to know which records relate to this decision. In the illustrated embodiment, at the left of the activity rectangle 1070 an icon is visible. The user can select the icon to see a specification file record for operation level material consumption and what the setting should be or the user can use a configuration wizard which takes the user through the steps involved in configuring the specification file. A specification file is a file that identifies what configuration of data is required from the customer for processing (essentially, a meta-model). This file identifies for the customer what data is needed and in what format, so that the customer can then create appropriate data and communicate it for processing.

Figure 19:
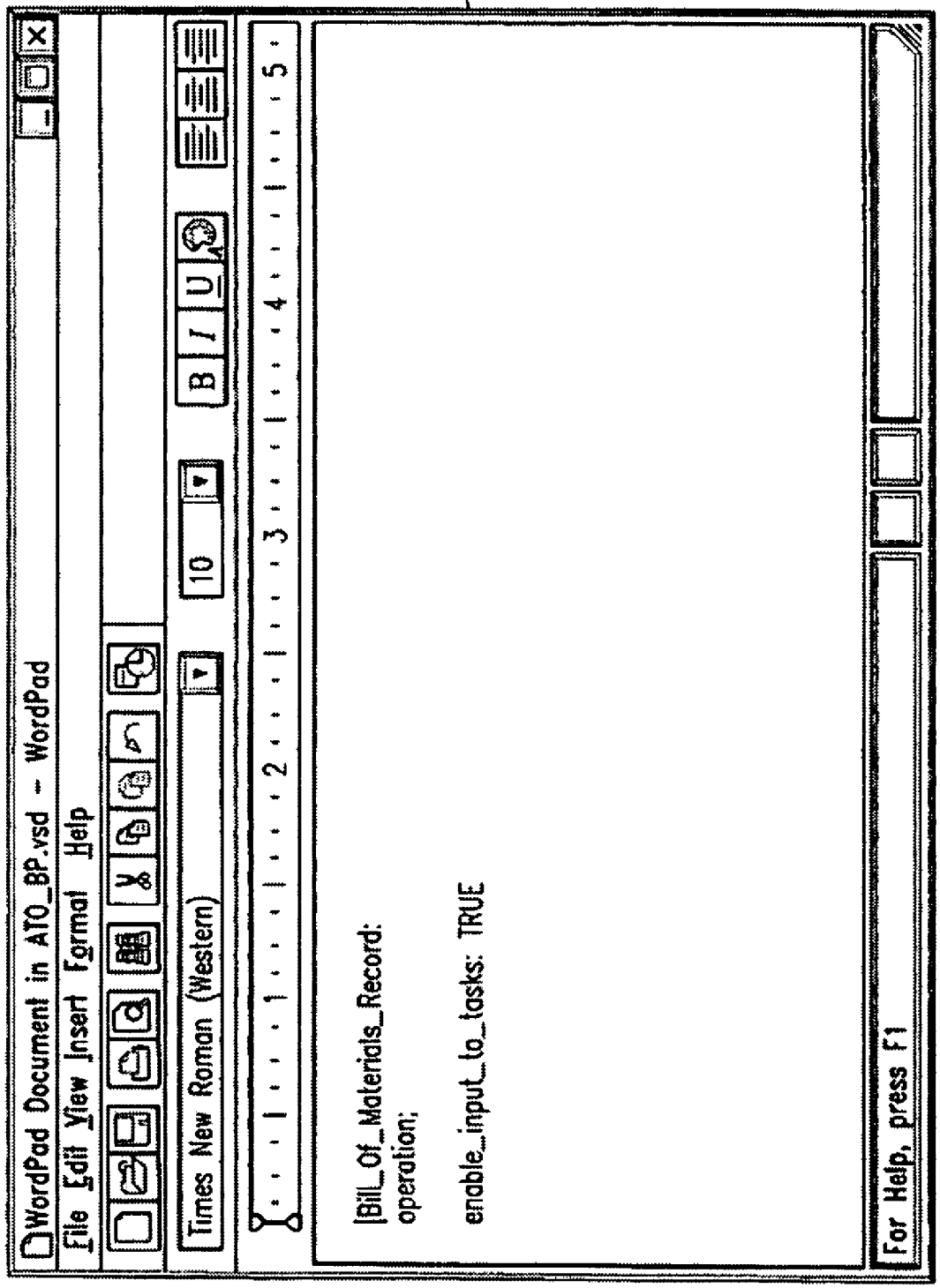
FIG. 19 illustrates an example specification file record.

In the example embodiment, if the user clicks on the icon next to an activity rectangle 1020a–1020c or 1070, the user is presented with the specification file record associated with the process activity associated with the activity rectangle. An example of such a specification file record 1100 is illustrated in FIG. 19.

In order to configure some or all of the specification file, the user may use a specification file configurator. This configurator may be accessed by right-clicking on the same icon which the user may click to access the specification file record illustrated in FIG. 19. After right-clicking on the icon, the user may be presented with a menu that includes an option to initiate the configurator. Upon selecting to initiate the configurator, the user may be provided with a main menu interface (not illustrated) that allows to user to select the type of record to be configured. Alternatively, the user may be taken directly to a configuration interface for the particular activity associated with the icon that was used to access the configurator (in this case, a BOM record configuration interface).

FIG. 20 illustrates an example BOM record configuration interface 1200. Upon selecting the relevant record (for example, the BOM record) from a main menu or upon selecting the configurator from a particular activity rectangle, 1020a–1020c or 1070 the user is presented with a configuration interface, such as configuration interface 1200. Configuration interface 1200 allows the user to select particular fields within the BOM record to configure within the specification file. Each field that is selected is added to the specification file and thus specified as being a portion of data that is to be used by the software being configured. In order to select a particular field for inclusion in the specification file, the user may select the associated check box. It should also be noted that certain fields may be mandatory in order to establish a basic configuration. These required fields may be pre-selected in the configuration interface.

FIG. 21 illustrates a example portion 1250 of a configured specification file relevant to BOM data. Portion 1250 has been configured by selecting the "operation" field check box in BOM record configuration interface 1200. Accordingly, the record for operation has been set and all other records preceded with the "#" sign are not valid for this record. When the user has completed the entire configuration process (for example, after selecting the desired records and fields within the business model(s) for an entire business topology), the user may then generate a complete specification file for that business model or topology. This complete specification file may then be used to specify all the data (and the data format) that should be input into the software solution being configured. A specification file may be generated before configuring an entire model, but such a specification file may be incomplete.

FIG. 22 illustrates an example server flag configuration interface 1300. Interface 1300 allows a user to select server flag settings, which are used to configure how the software solution operates. The server flag settings can be set to default values or changed according to configuration settings as determined when reviewing the business processes. Each flag setting may have associated help information designed to assist the user in making informed decisions regarding the setting parameters.

Figure 23:
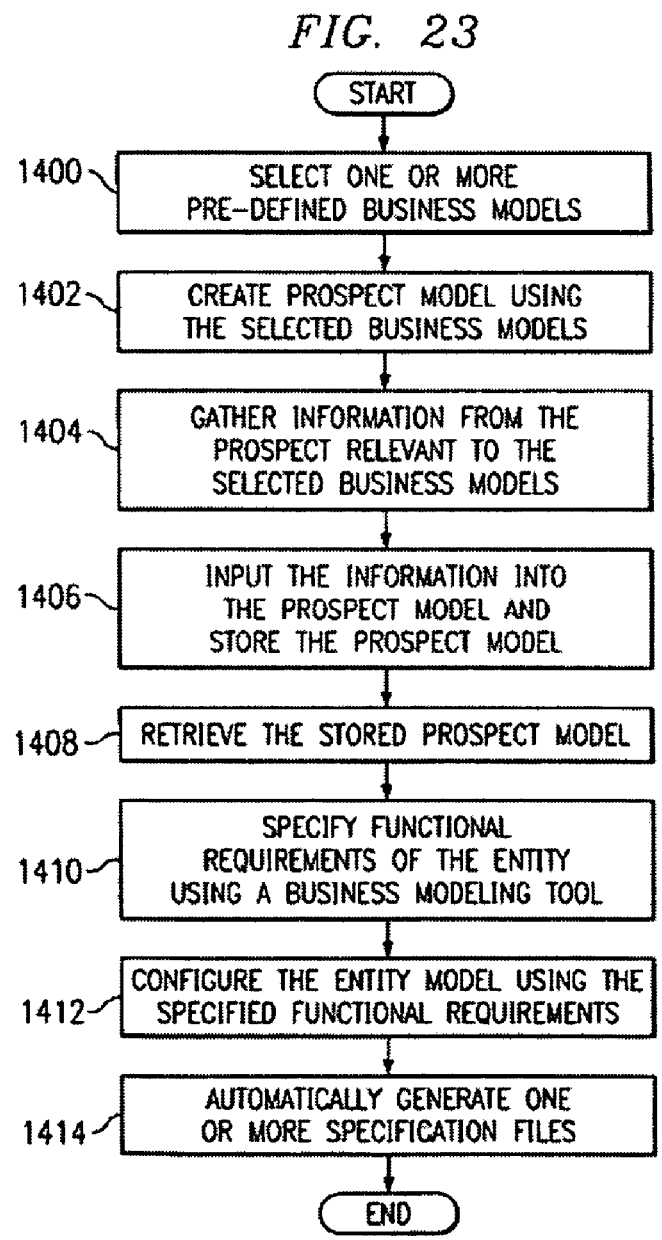
FIG. 23 illustrates an example method for deploying software.

FIG. 23 illustrates an example method for deploying software using the procedures described above. The example method begins at step 1400 where, during a sales phase of a software deployment cycle, a user selects one or more pre-defined business models applicable to an prospect for which the software is being deployed. As described above, the business models are directly or indirectly associated with particular business functions. At step 1402, a prospect model is created using the selected business models, and information is gathered from the prospect that is relevant to the selected business models at step 1404. At step 1406, the gathered information is input into the prospect model and the model is stored. As described above, this information may be gathered and input through a series of inquiry sessions.

After receiving a decision from the prospect to implement the software, the "prospect" becomes a customer and the implementation phase of the software deployment cycle begins. At step 1408, the stored prospect model is retrieved (for example, by an implementation team). This prospect model may be saved as a deployment model. At step 1410, functional requirements of the entity are specified using a business modeling tool (as described above), and the deployment model is configured using the specified functional requirements at step 1412. At step 1414, one or more specification files are automatically generated according to the configured entity model, as described above, and the method ends.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for deploying business software, comprising:
   implementing a sales phase of a business software deployment cycle, the sales phase comprising:
      selecting one or more pre-defined business models applicable to a business entity in which the software is being deployed, the business models being associated with particular business functions;
      creating an entity model using the one or more selected business models;
      gathering information from the entity relevant to the selected business models; and
      inputting the information into the entity model and storing the entity model; and
   executing an implementation phase of the business software deployment cycle, in response to receiving a decision from the entity to implement the business software, the implementation phase comprising:
      retrieving the stored entity model;
      specifying functional requirements of the entity using a business modeling tool;
      configuring the entity model using the specified functional requirements; and
      automatically generating one or more specification files according to the configured entity model, the specification files identifying the data to be input to the software after the software is deployed.

2. The method of claim 1, wherein selecting one or more business models comprises selecting one or more business cases, each business case including one or more business models.

3. The method of claim 2, wherein each business case is associated with a business topology.

4. The method of claim 2, wherein each business case is associated with a industry vertical.

5. The method of claim 1, wherein gathering information from the entity comprises conducting one or more inquiry sessions for one or more of the selected business models.

6. The method of claim 5, wherein an inquiry session is performed for one or more core functions included within a business model.

7. The method of claim 5, wherein the one or more inquiry sessions are performed in association with the business modeling tool.

8. The method of claim 1, wherein configuring the entity model comprises specifying software configuration information using one or more business process interfaces of the business modeling tool, each business process interface including a business process associated with the corresponding business model.

9. The method of claim 8, wherein specifying software configuration information comprises selecting one or more alternative paths from a decision step of business process in a business process interface.

10. The method of claim 8, wherein specifying software configuration information comprises performing an activity associated with an activity step of a business process in a business process interface.

11. The method of claim 1, further comprising performing prospect qualification of the entity during the sales phase.

12. The method of claim 1, further comprising using one or more milestone charts that identify activities to be performed during the sales and implementation phases.

13. The method of claim 1, further comprising using one or more activity checklists that include links to tools to be used in performing activities during the sales and implementation phases.

14. Deployment software for deploying business software, the deployment software embodied in a computer-readable medium and operable, when executed, to:
   implementing a sales phase of a business software deployment cycle, the sales phase comprising:
      receive from a user a selection of one or more pre-defined business models applicable to a business entity in which the business software is being deployed, the business models being associated with particular business functions;
      create an entity model using the one or more selected business models;

receive from the user information relating to the entity and relevant to the selected business models;
store the entity model;
executing an implementation phase of the business software deployment cycle, in response to receiving a decision from the entity to implement the business software, the implementation phase comprising:
retrieve the stored entity model;
receive functional requirements of the entity using a business modeling tool;
configure the entity model using the specified functional requirements; and
generate one or more specification files according to the configured entity model, the specification files identifying the data to be input to the business software after the business software is deployed.

15. The software of claim 14, wherein receiving the selection of one or more business models comprises receiving the selection of one or more business cases, each business case including one or more business models.

16. The software of claim 15, wherein each business case is associated with a business topology.

17. The software of claim 15, wherein each business case is associated with a industry vertical.

18. The software of claim 14, wherein receiving information from the user comprises receiving information via one or more inquiry sessions for one or more of the selected business models.

19. The software of claim 18, wherein an inquiry session is performed for one or more core functions included within a business model.

20. The software of claim 18, wherein the one or more inquiry sessions are performed in association with the business modeling tool.

21. The software of claim 14, wherein configuring the entity model comprises receiving software configuration information via one or more business process interfaces of the business modeling tool, each business process interface including a business process associated with the corresponding business model.

22. The software of claim 21, wherein the software configuration information is received via the user selecting one or more alternative paths from a decision step of business process in a business process interface.

23. The software of claim 21, wherein the software configuration information is received via the user performing an activity associated with an activity step of a business process in a business process interface.

24. The software of claim 14, further operable to perform prospect qualification of the entity during the sales phase.

25. The software of claim 14, further operable to provide one or more milestone charts that identify activities to be performed during the sales and implementation phases.

26. The software of claim 14, further operable to provide one or more activity checklists that include links to tools to be used in performing activities during the sales and implementation phases.

* * * * *